United States Patent
Lemoff (10) Patent No.: US 10,580,334 B2
(45) Date of Patent: Mar. 3, 2020

(54) PERIPHERAL FEMTOPROJECTOR OPTICAL SYSTEMS

(71) Applicant: Spy Eye, LLC, Los Gatos, CA (US)

(72) Inventor: Brian Elliot Lemoff, Morgan Hill, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 15/982,989

(22) Filed: May 17, 2018

(65) Prior Publication Data
US 2019/0355287 A1  Nov. 21, 2019

(51) Int. Cl.
| G09G 3/00 | (2006.01) |
| G02C 7/04 | (2006.01) |
| G06T 19/00 | (2011.01) |
| G06F 3/01 | (2006.01) |

(52) U.S. Cl.
CPC ............... *G09G 3/002* (2013.01); *G02C 7/04* (2013.01); *G06T 19/006* (2013.01); *G06F 3/012* (2013.01); *G06F 3/013* (2013.01); *G09G 2340/0407* (2013.01)

(58) Field of Classification Search
CPC ... G02B 27/017; G02B 27/0172; G09G 3/022
See application file for complete search history.

(56) References Cited

U.S. PATENT DOCUMENTS

| 5,638,218 A | 6/1997 | Oomura |
| 5,638,219 A | 6/1997 | Medina Puerta et al. |
| 6,215,593 B1 * | 4/2001 | Bruce ............ G02B 6/08 359/619 |
| 6,560,039 B1 | 5/2003 | Webb et al. |
| 8,134,778 B2 | 3/2012 | Guyer |
| 8,786,675 B2 | 7/2014 | Deering |
| 9,063,352 B2 | 6/2015 | Ford et al. |
| 9,111,473 B1 | 8/2015 | Ho et al. |
| 9,134,534 B2 | 9/2015 | Border et al. |
| 9,251,745 B2 | 2/2016 | Sprague |
| 2011/0221659 A1 | 9/2011 | King, III et al. |

(Continued)

OTHER PUBLICATIONS

Peifu, G., "Design and Preparation of Quarter-Wave Plate Coatings," National Air Intelligence Center, May 12, 1995, 16 pages.

(Continued)

*Primary Examiner* — Lixi C Simpson
(74) *Attorney, Agent, or Firm* — Fenwick & West LLP (57) ABSTRACT

In some designs, an eye-mounted display includes multiple femtoprojectors contained inside a contact lens. Femtoprojectors that project to peripheral regions of the retina can have lower resolution. In some designs, these peripheral femtoprojector optical system includes an optically transparent core with two ends. The image source is located at one end, and a lens element is located at the other end. The end with the image source is the same size or larger than the end with the lens element. The core may be a cylinder or a frustum, for example. The sidewall structure extending between the two ends is designed to reduce stray rays from the image source. For example, the sidewall structure may absorb stray rays or may redirect rays so that they do not exit the core or so that they do not enter the pupil of the eye.

19 Claims, 10 Drawing Sheets

(56) References Cited

U.S. PATENT DOCUMENTS

| | | | |
|---|---|---|---|
| 2015/0301338 A1 | 10/2015 | Van Heugten | |
| 2015/0312560 A1* | 10/2015 | Deering | G02B 13/0085 |
| | | | 345/1.3 |
| 2016/0091737 A1* | 3/2016 | Kim | G02C 7/04 |
| | | | 351/158 |
| 2017/0371184 A1* | 12/2017 | Shtukater | G02C 11/10 |

OTHER PUBLICATIONS

Tremblay, E.J. et al., "Ultrathin Cameras Using Annular Folded Optics," Applied Optics, pp. 463-471, vol. 46, No. 4.
U.S. Appl. No. 15/570,707, filed Oct. 18, 2017, Inventor Miller, G.D. et al.

\* cited by examiner

PERIPHERAL FEMTOPROJECTOR OPTICAL SYSTEMS

BACKGROUND

1. Technical Field

This disclosure relates generally to projectors for eye-mounted displays.

2. Description of Related Art

An eye-mounted display has been proposed by Deering. See, e.g. U.S. Pat. No. 8,786,675, "Systems using eye mounted displays." One type of eye-mounted display is based on a tiny projector mounted inside a contact lens. The projector projects images onto the retina of a person wearing the contact lens. The projector must be very small to fit in the contact lens, so small that, for convenience, Deering called it a "femtoprojector". A typical femtoprojector preferably is no larger than about one or two millimeters in any dimension.

Eye-mounted displays can be used for virtual reality applications and also for augmented reality applications. In virtual reality applications, the images projected by the eye-mounted display replace what the user would normally see as his external environment. In augmented reality applications, the images projected by the eye-mounted display augment what the user would normally see as his external environment, for example they may appear as additions to the external environment.

The femtoprojectors in an eye-mounted display include an image source and an optical system. A femtoprojector's optical system is designed to project images from the image source onto the retina so that the images appear in a person's field of vision. The femtoprojector optical systems are constrained to fit inside a contact lens while also providing appropriate magnification and sufficient image quality.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

In some designs, an eye-mounted display includes multiple femtoprojectors contained inside a contact lens. Each femtoprojector includes an image source and an optical system that projects images from the image source onto a user's retina. Different femtoprojectors project to different areas of the retina. In one approach, some femtoprojector(s) project images onto the fovea and other femtoprojectors project images onto more peripheral regions of the retina. These will be referred to as central femtoprojector(s) and peripheral femtoprojectors, respectively. If the images are overlapping, they can be stitched together to create a larger image in the aggregate. Because the retina has higher resolution in the fovea and lower resolution in the periphery, the requirements on the image sources and the optical systems can be different between the central and peripheral femtoprojectors, or even between peripheral femtoprojectors projecting to different regions of the retina.

In some designs, the peripheral femtoprojectors have lower resolution (i.e., the pixels as projected onto the retina will be larger), they cover a larger total area on the retina (i.e., the projected image appears to cover a larger portion of the user's field of view), and they have larger magnifications than the central femtoprojector. In some designs, the peripheral femtoprojector optical system includes an optically transparent core with two ends. The image source is located at one end, and a lens element is located at the other end. The end with the image source is the same size or larger than the end with the lens element. The core could be a cylinder or a frustum, for example. The sidewall structure extending between the two ends is designed to reduce stray rays from the image source. For example, the sidewall structure may absorb stray rays or may redirect rays so that they do not exit the core or so that they do not enter the pupil of the eye.

The core may be solid or it may be air. The lens element may be a single curved surface or two or more surfaces. Any surfaces could be aspheres. Generally, the optical path from the image source to the exit of the optical system (i.e., the lens element) is not folded. This reduces the length of the optical path, but the reduced length usually is sufficient to achieve the design requirements of peripheral femtoprojectors (but may not be sufficient for central femtoprojectors).

Figure 1A:
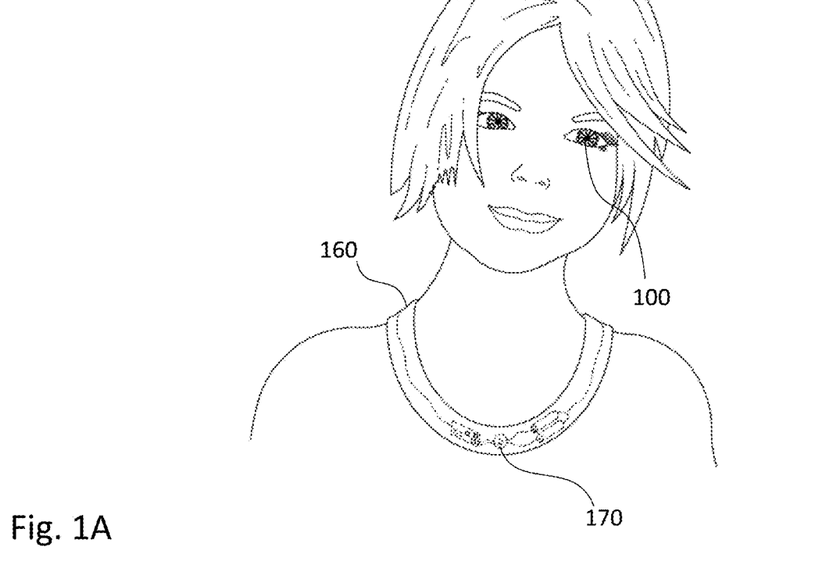
FIG. 1A shows a user wearing an eye-mounted display in communication with an auxiliary necklace.
Figure 1B:
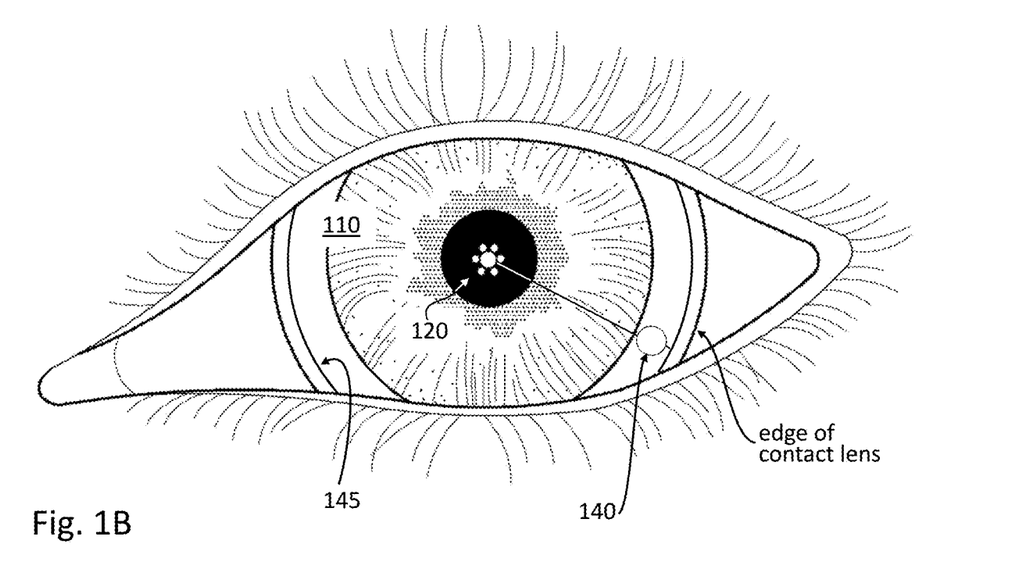
FIG. 1B shows a magnified view of the eye-mounted display mounted on the user's eye.

In more detail, FIG. 1A shows a user wearing an eye-mounted display 100 in communication with a necklace 160. FIG. 1B shows a magnified view of the user's eye and eye-mounted display 100. The eye-mounted display 100 includes a contact lens 110 that is worn on the surface of the eye. The following examples use a scleral contact lens but the contact lens does not have to be scleral. The contact lens 110 contains multiple femtoprojectors 120, some of which are central and some of which are peripheral. In FIG. 1B, the large center circle represents a central femtoprojector, and the six smaller surrounding circles each represent a peripheral femtoprojector. The femtoprojectors 120 project images onto the user's retina.

The contact lens 110 moves with the user's eye 100 as the user's eye rotates in its socket. Because the femtoprojectors 120 are mounted in the contact lens 110, they also move with the user's eye and generally will project to the same region of the retina. The central femtoprojector always projects images to the fovea, and the peripheral femtoprojectors always project images to more peripheral regions which have lower resolutions.

In this example, the contact lens 110 also contains electronics 140 and a coil 145. In some embodiments, the coil 145 is a power coil that receives power wirelessly, for example via magnetic induction. In other embodiments, the contact lens 110 includes a battery that supplies power to the femtoprojectors 120. The electronics 140 may be used to control the femtoprojectors, receive or process images from the femtoprojectors, provide power to the femtoprojectors, and/or transmit data to/from the femtoprojectors. The contact lens 110 may also include other components.

FIG. 1A shows an implementation where, in addition to the eye-mounted display 100, the user is also wearing a necklace 160 that contains components of the eye-mounted display system. In this example, the necklace 160 includes a wireless transmitter 170 that transmits image data and/or power to the eye-mounted display 100. Image transmission to an eye-mounted display is subject to data rate constraints due to size and power consumption limitations of electronics in a contact lens.

Figure 2A:
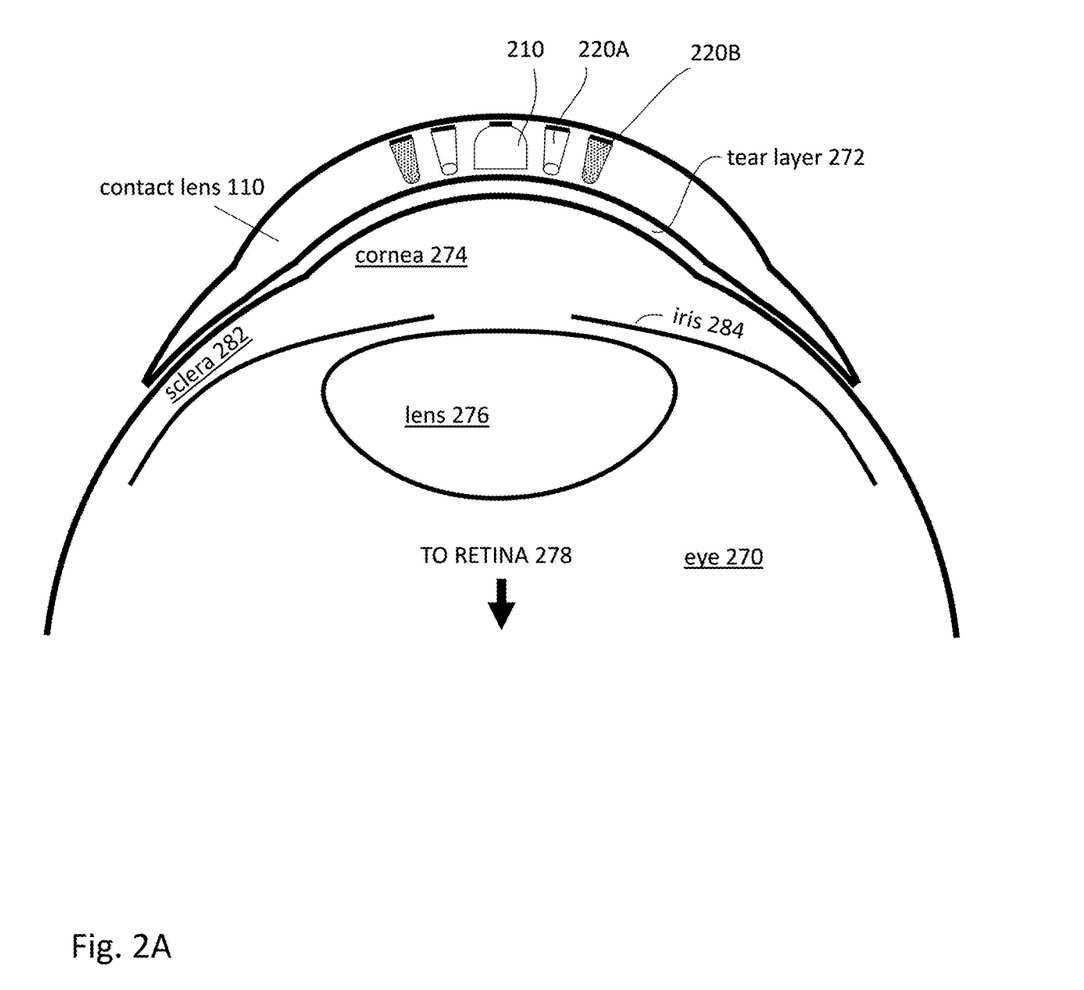
FIG. 2A shows a cross sectional view of an eye-mounted display containing multiple femtoprojectors in a contact lens.

FIG. 2A shows a cross sectional view of an eye-mounted display containing a set of femtoprojectors 210-220 in a scleral contact lens 110. In this example, there are three types of femtoprojectors: a central femtoprojector 210 and two types of peripheral femtoprojectors 220A and 220B. The contact lens 110 is separated from the cornea 274 of the user's eye 270 by a tear layer 272. Over the cornea 274, the tear layer 272 may be as thick as a hundred microns or more while it may be only a few microns thick over the sclera 282. The aqueous of the eyeball is located between the cornea and the crystalline lens 276 of the eye. The vitreous fills most of the eyeball including the volume between the crystalline lens 276 and the retina 278. The iris 284 limits the aperture of the eye.

The contact lens 110 preferably has a thickness that is less than two mm, and the femtoprojectors 210-220 each preferably fits in a 2 mm by 2 mm by 2 mm volume, or less. The contact lens 110 should be comfortable to wear and maintains eye health by permitting oxygen to reach the cornea 274.

Figure 2B:
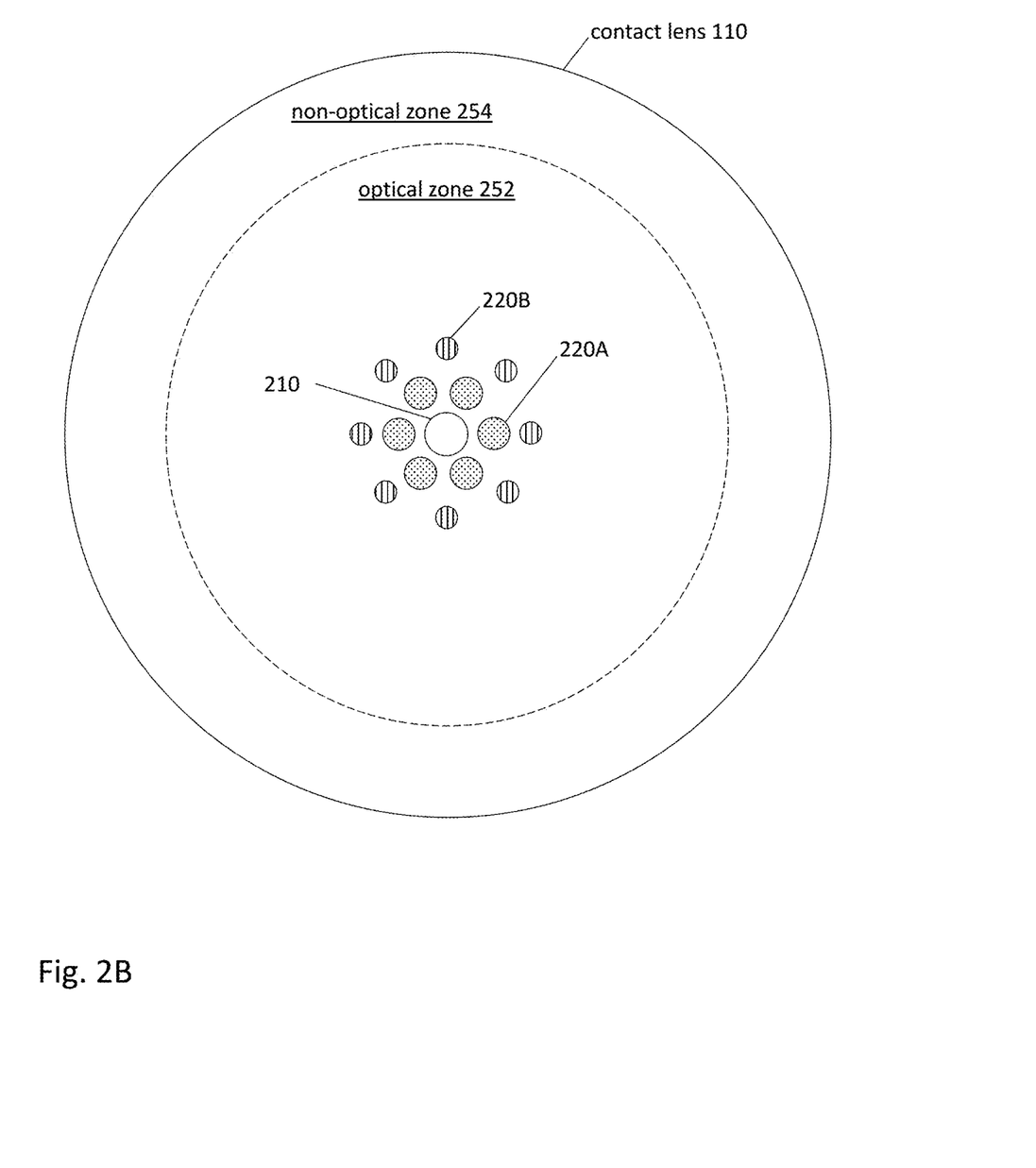
FIG. 2B shows a front view of an eye-mounted display containing multiple femtoprojectors in a contact lens.

FIG. 2B shows a top view of the eye-mounted display with multiple femtoprojectors 210-220 in a contact lens 110. The ratio of the contact lens diameter to femtoprojector lateral size may be 15:1 for the largest femtoprojector. This ratio may be between about 15:1 and 30:1, but may be as small as 5:1 or smaller or as large as 50:1 or larger. FIG. 2B shows three types of femtoprojectors; one central femtoprojector 210, six "zone 1" peripheral femtoprojectors 220A, and eight "zone 2" peripheral femtoprojectors 220B. Eye-mounted displays with 49 or more femtoprojectors arranged in more than two zones in a contact lens are proposed. The femtoprojectors 210-220 in FIG. 2B are also shown as having different sizes.

Figure 2C:
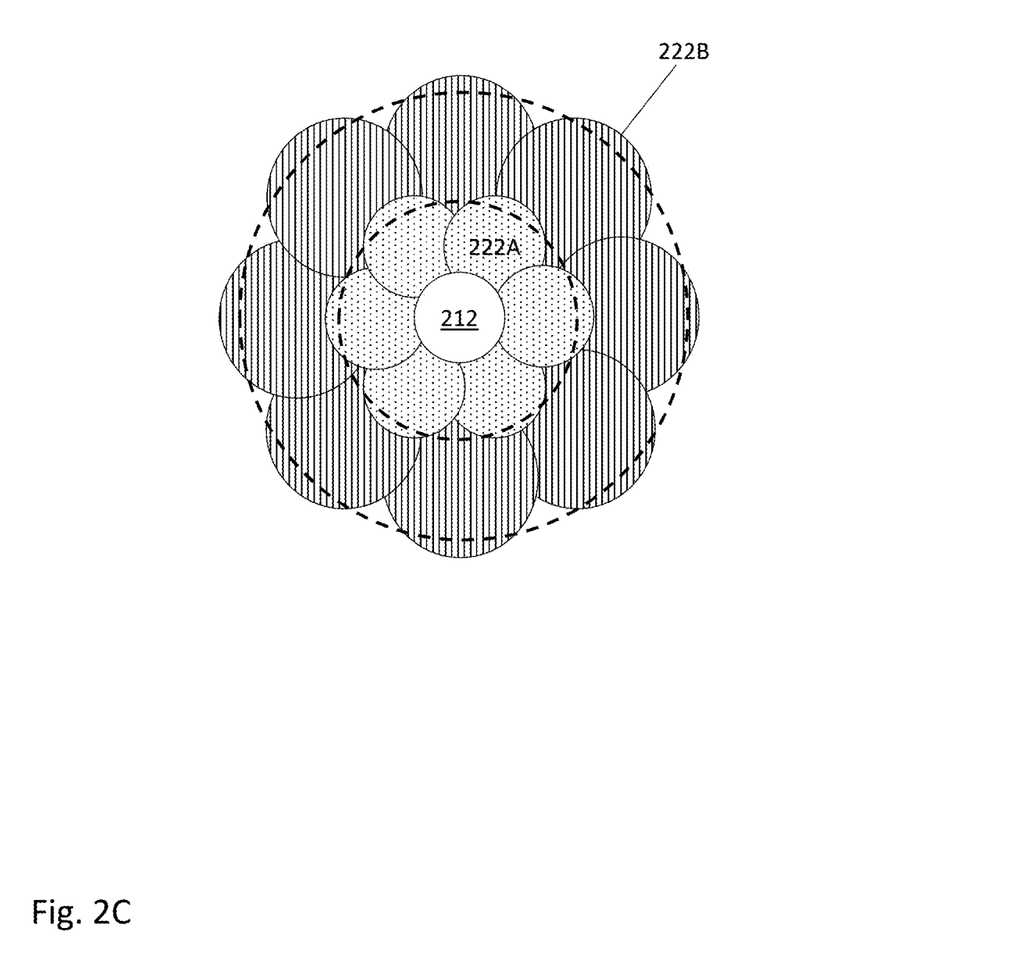
FIG. 2C shows images projected onto the retina by the femtoprojectors of FIGS. 2A and 2B.

The retinal receptive fields are most densely packed in the fovea and become progressively less densely packed away from the fovea. Accordingly, in one implementation, femtoprojectors that project to the fovea generate higher resolution images (i.e., smaller size projected pixels) on the retina, and those that project to the periphery of the retina generate correspondingly lower resolution images (i.e., larger size projected pixels). FIG. 2C shows the images projected by the femtoprojectors onto the retina. Image 212 is the high resolution image projected by central femtoprojector 210. Images 222A are the lower resolution images projected by the zone 1 peripheral femtoprojectors 220A. Images 222B are the lowest resolution images projected by the zone 2 peripheral femtoprojectors 220B. Each group of peripheral femtoprojectors (the zone 1 femtoprojectors and the zone 2 femtoprojectors) project to an approximately annular region shown by the dashed circles. Because of the geometry, the peripheral femtoprojectors may be projecting off-axis rather than projecting symmetrically around the optical axis of the femtoprojector. Note that in this example the images from the lower resolution femtoprojectors are larger in size.

The entire display, made up of all the femtoprojectors, may be a variable resolution display that generates only the resolution that each region of the eye can actually see, vastly reducing the total number of individual "display pixels" required compared to displays of equal resolution and field of view that are not eye-mounted. Pixels in an eye-mounted display that are projected to lower resolution off-foveal regions of the retina will always be projected to those lower resolution regions and, therefore, they can be permanently lower resolution while still matching the eye's resolution. The variable resolution can be achieved by using groups of femtoprojectors with different resolutions. For example, central femtoprojector 212 projects the smallest size pixel, zone 1 peripheral femtoprojectors 222A project larger pixels, and zone 2 femtoprojectors 222B project the largest pixels. Variable resolution can also be implemented within a femtoprojector. For example, pixels projected by femtoprojector 222A increase in size as they are located farther away from the fovea.

In FIG. 2B, the contact lens 110 is roughly divided by the dashed circle into an optical zone 252 and a non-optical zone 254. Components in the optical zone 252 may be in the optical path of the eye, depending on how far open the iris is. Components in the non-optical zone 254 fall outside the aperture of the eye. In addition to the femtoprojectors 210-220, the contact lens may also contain other components for data transmission, power and/or positioning. Data transmission components may include antennae or optical/infrared photodetectors, data storage and buffering, controls, and possibly also on-lens processing. Power components may include coils for power transmission and batteries for power storage. Positioning components may include accelerometers, magnetometers, gyroscopes and fiducial or other structures used for eye tracking and head tracking.

In addition to the eye-mounted display, the overall system may also include a head tracker, eye tracker and other components. The system receives input images (including possibly video), which are to be displayed to the human user via the eye-mounted display. The femtoprojectors 210-220 project the images on the user's retina, thus creating an image of virtual objects in the user's field of view. Electronics and/or software receive the input images and produce the appropriate data and commands to drive the femtoprojectors. The head tracker and eye tracker provide information about head movement/position and eye movement/position, so that the information provided to the femtoprojectors can be compensated for these factors.

There are many ways in which this functionality can be configured with an eye-mounted display(s) to create embodiments of eye-mounted display systems. Portions of these subsystems may be external to the user, while other portions may be worn by the user in the form of a headpiece or glasses. Components may also be worn on a belt, armband, wrist piece, necklace or other types of packs. FIG. 1A shows an example where some functionality is implemented in a necklace 160 worn by the user.

Figure 3:
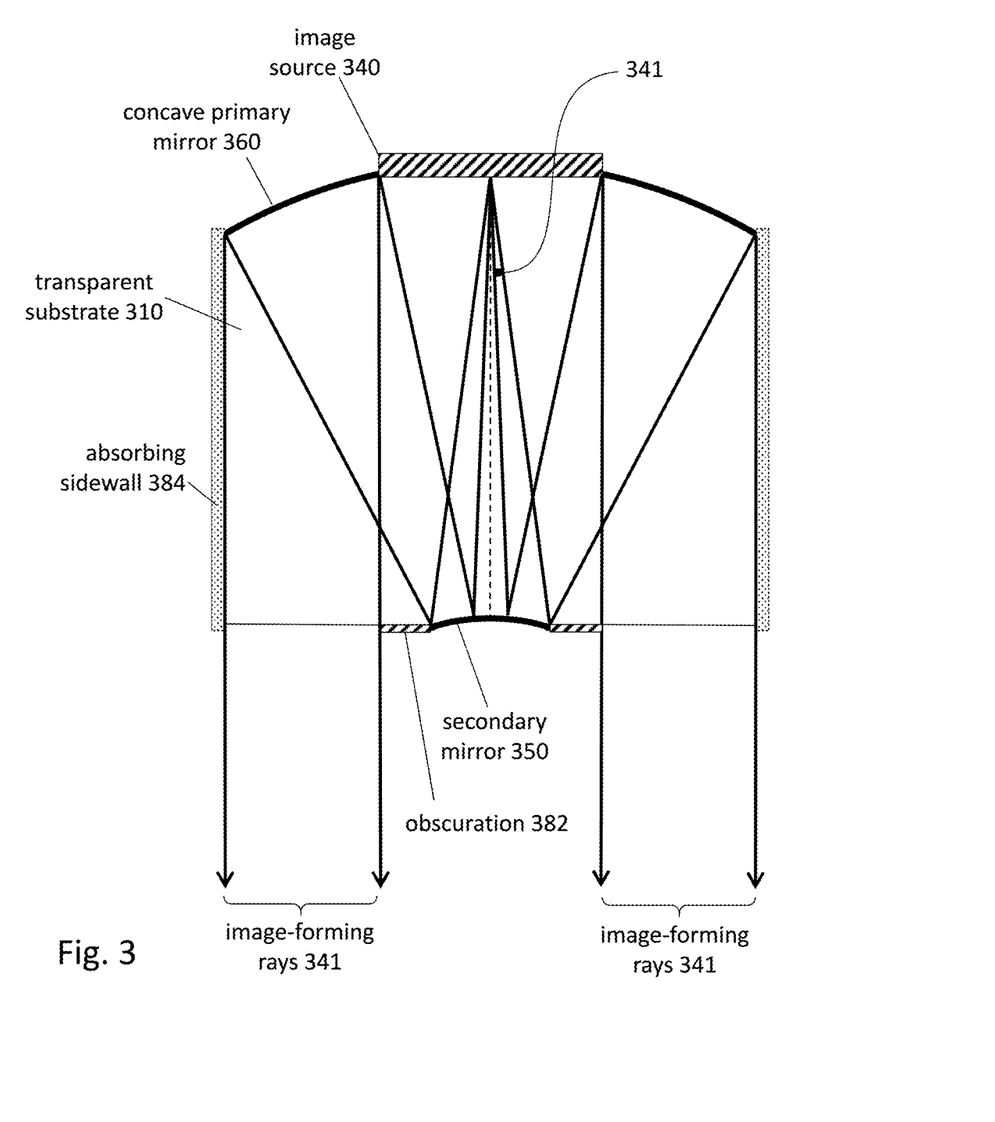
FIG. 3 shows a cross sectional view of a central femtoprojector.

FIG. 3 shows a cross sectional view of an example design for a central femtoprojector. This example includes a solid, transparent substrate 310 having index of refraction $n_1$. Contact lens material, in which a femtoprojector optical system may be embedded, has an index of refraction $n_2$. The solid transparent substrate 310 may be made from plastic, glass or other transparent materials.

The femtoprojector optical system of FIG. 3 includes a concave primary mirror 360 and a convex secondary mirror 350. Either or both of these may be aspheric. The concave primary mirror 360 may be formed by coating an end of the substrate 310 with a reflective material such as a metal (e.g. aluminum or silver) or an engineered stack of dielectric layers. The shape of the primary mirror 360 may be made by any of several different techniques. For example, if the substrate is injection-molded plastic, then the shape of the primary mirror 360 follows the shape of the mold used. Alternatively, the shape of the primary mirror 360 may be made by diamond turning the substrate on a lathe. Or, the shape of the primary mirror 360 may be made by photolithography and etching steps. Gray scale photolithography may be used to etch a mirror surface profile, for example. Wafer scale optics techniques including embossing, compression molding and/or UV curing photosensitive polymers may also be used to form mirror profiles. Additive manufacturing or three-dimensional printing (e.g. via two-photon polymerization) techniques may also be employed.

The primary mirror 360 includes a mounting area. An image source 340, such as an LED (light emitting diode) display chip with an array of individually addressable emitters, is mounted at this location. Alternate image sources include illuminated photomasks or single light emitting diodes, as examples.

The secondary mirror 350 faces the image source 340, and the primary mirror 360 faces the secondary mirror 350. Light rays 341 from the image source 340 are first incident on and reflected by the secondary mirror 350 (convex in this example). The reflected rays 341 are then incident on and further reflected by the primary mirror 360 before exiting the optical system. When the optical system is used in a femtoprojector, light from the image source 340 strikes the secondary mirror 350 before the primary mirror 360. Although the secondary mirror 350 in FIG. 3 is drawn smaller than the image source 340, it need not be. The secondary mirror 350 and primary mirror 360 cooperate to project the image from the image source 340 onto the user's retina.

The system also includes a light baffle system to block or at least reduce the stray rays that reach the exit aperture and/or to direct stray rays to areas away from the projected image. In FIG. 3, the baffle system includes an absorbing obscuration 382 and sidewalls 384 (or other types of side baffles). Other examples of central femtoprojectors are described in U.S. patent application Ser. No. 15/570,707 "Femtoprojector Optical Systems," which is incorporated herein by reference.

Figure 4:
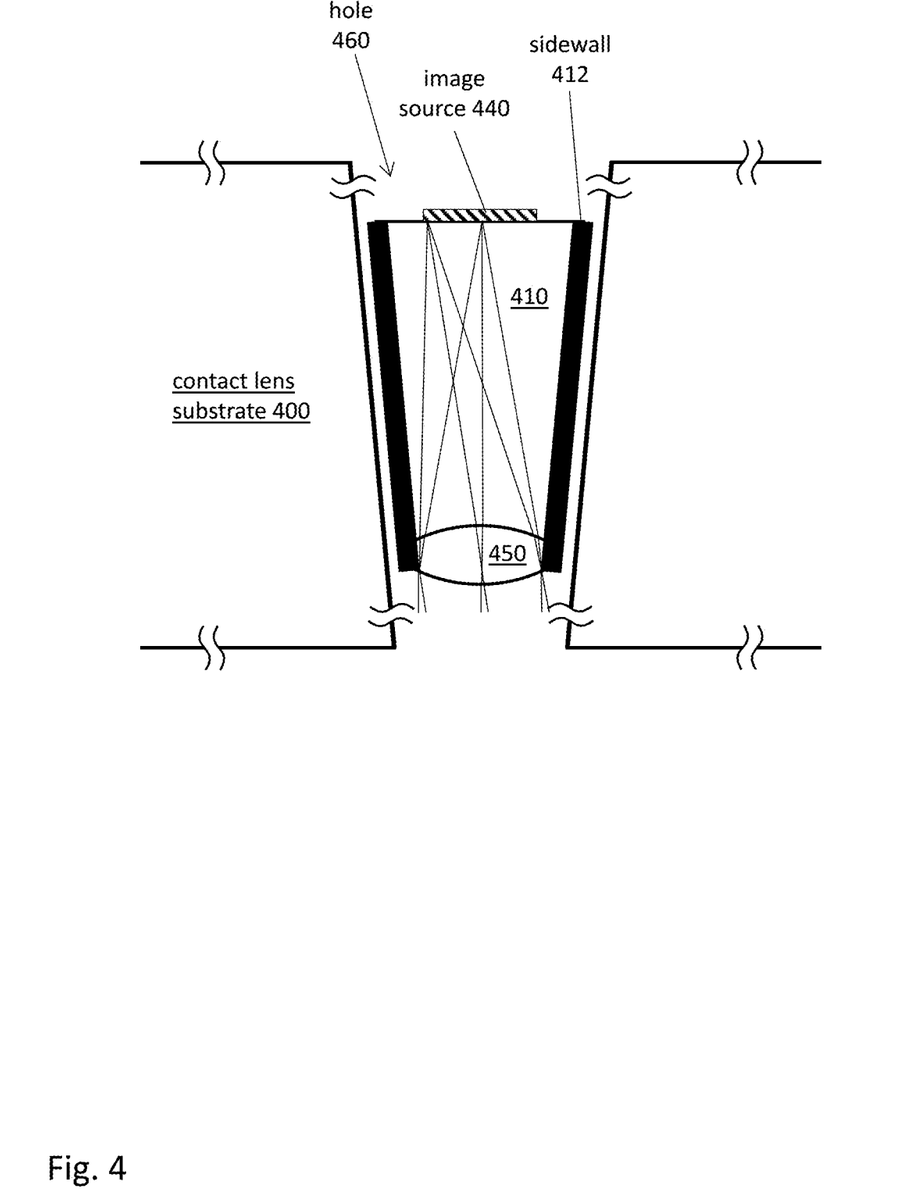
FIG. 4 shows a cross sectional view of a zone 1 peripheral femtoprojector.
Figure 5:
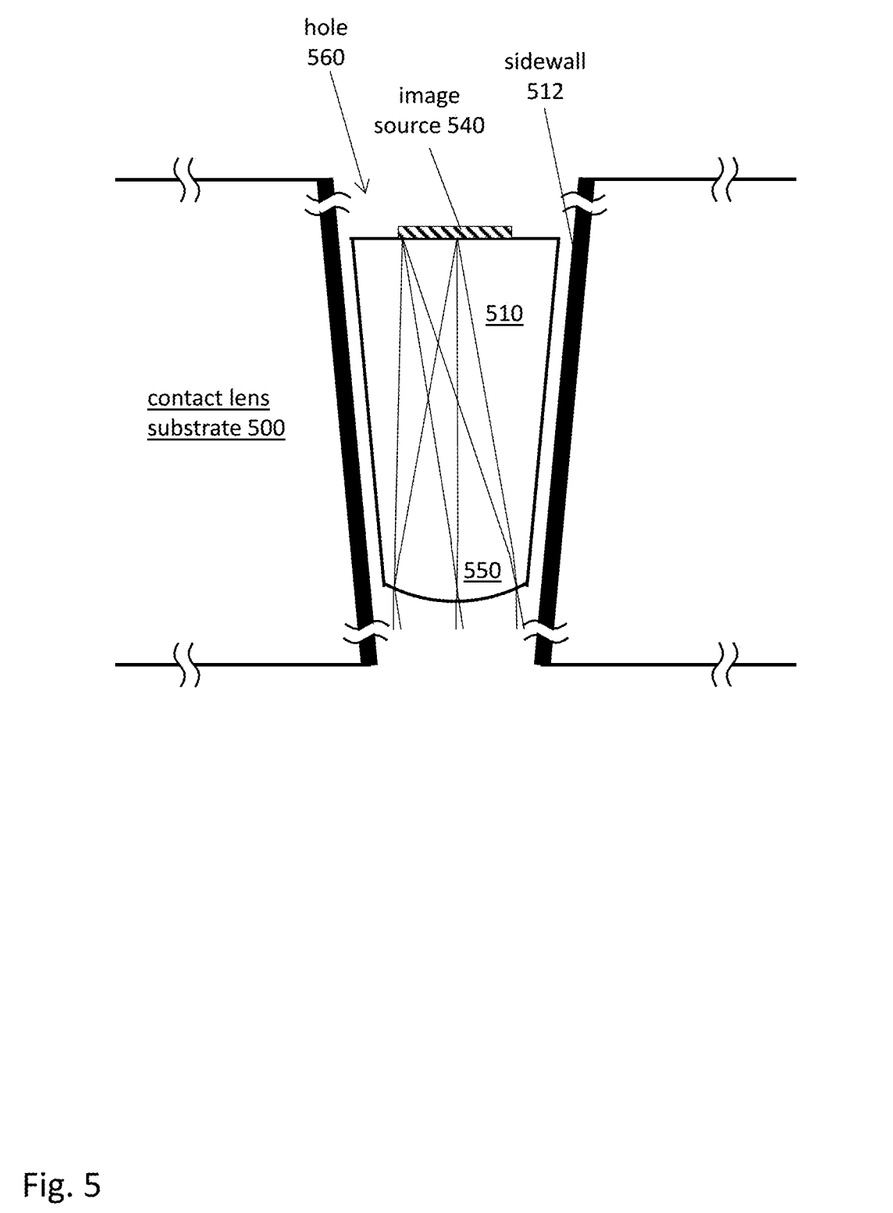
FIG. 5 shows a cross sectional view of a zone 2 peripheral femtoprojector.

FIGS. 4 and 5 show cross sectional views of two different peripheral femtoprojectors. In FIG. 4, the optical system includes an air core 410, for example the interior of a hollow tube. The air core 410 has the shape of a conical frustum. The sides 412 of the air core are constructed of or are coated with an absorbing material. The large end of the frustum contains the image source 440. The opposite end contains a lens element 450, which in this example is a biconvex lens.

The sidewall structure 412 reduces stray rays from the image source. Most rays incident on the sidewall structure 412 are absorbed. If the sidewall 412 is not perfectly absorbing, some rays may be reflected or scattered. Due to the geometry, reflected rays typically are reflected away from the exit aperture (lens element 450).

In FIG. 4, a tapered hole 460 is formed in the contact lens material 400, which may be a rigid gas permeable material. The femtoprojector is inserted into the tapered hole 460. The hole 460 may include alignment aids to aid in positioning the femtoprojector. The drawing of FIG. 4 shows a gap between the femtoprojector and the sides of the hole so that the reader can distinguish the two but there is no such gap in the physical implementation.

In one design, the image source 440 is 250 um wide, and the frustum base (the end with the image source 440) is 500 um diameter. The other end with the lens 450 is 300 um diameter. The entire optical system from the image source 440 (not including the thickness of the image source) to the end of the lens 450 is 950 um long. The core 410 is an air core. This design is capable of achieving 20/72 resolution if the pixels in the image source 440 have a 1 um pitch. The projected image has a "span of eccentricity" of 15 degrees. That is, the femtoprojector projects an image onto the retina that appears to span 15 degrees of the user's field of view. The 15 degrees is measured in air in object space. This is referred to as the "span of eccentricity" of the femtoprojector. In cases where this span is different for differently shaped/sized eyes, then the span of eccentricity is determined assuming a standard eye model. Each one degree of span of eccentricity corresponds to approximately a 0.3 mm span of the image on the retina. Variants can project images with a span of eccentricity of 20 degrees or more.

In FIG. 5, the optical system includes a solid core 510, for example glass or plastic. Here, the solid core 510 has the shape of a conical frustum. The large end of the frustum contains the image source 540. The opposite end contains a lens element 550, which in this example is the curved end of the core 510. The core 510 may be manufactured using the techniques described above: molding, diamond turning, photolithography and etching, embossing, compression molding, UV curing photosensitive polymers, additive manufacturing and three-dimensional printing, for example.

In FIG. 5, a tapered hole 560 is formed in the contact lens material 500, which may be a rigid gas permeable material. The sides of the hole 560 are coated with an absorbing material, such as dark colored epoxy (Master Bond EP42HT-2MED Black, for example). The femtoprojector is inserted into the tapered hole. The hole 560 may include alignment aids to aid in positioning the femtoprojector. The sides of the hole 560 serve as an absorbing sidewall structure 512 for the optical system. The sidewall structure 512 reduces stray rays from the image source. Most rays incident on the sidewall structure 512 are absorbed. If the sidewall 512 is not perfectly absorbing, some rays may be reflected or scattered. Due to the geometry, reflected rays typically are reflected away from the lens element 550 and eventually will be absorbed.

In one design, the image source 540 is 250 um wide, and the frustum base (the end with the image source 540) is 500 um diameter. The other end with the lens 550 is 250 um diameter. The entire optical system from the image source 540 (not including the thickness of the image source) to the end of the lens 550 is 950 um long. The core 510 is an air core. This design is capable of achieving 20/120 resolution if the pixels in the image source 540 have a 1.25 um pitch. The femtoprojector has a span of eccentricity of 20 degrees. Variants can project images with spans of eccentricity of 25 degrees or more.

The mounting techniques shown in FIGS. 4 and 5 can be used with either femtoprojector design. That is, the air core femtoprojector of FIG. 4 may have absorbing sidewalls as shown in FIG. 4 or may be inserted into a hole with absorbing sidewalls as in FIG. 5. Similarly, the solid core femtoprojector of FIG. 5 may have absorbing sidewalls as shown in FIG. 4 or may be inserted into a hole with absorbing sidewalls as in FIG. 5.

Figure 6:
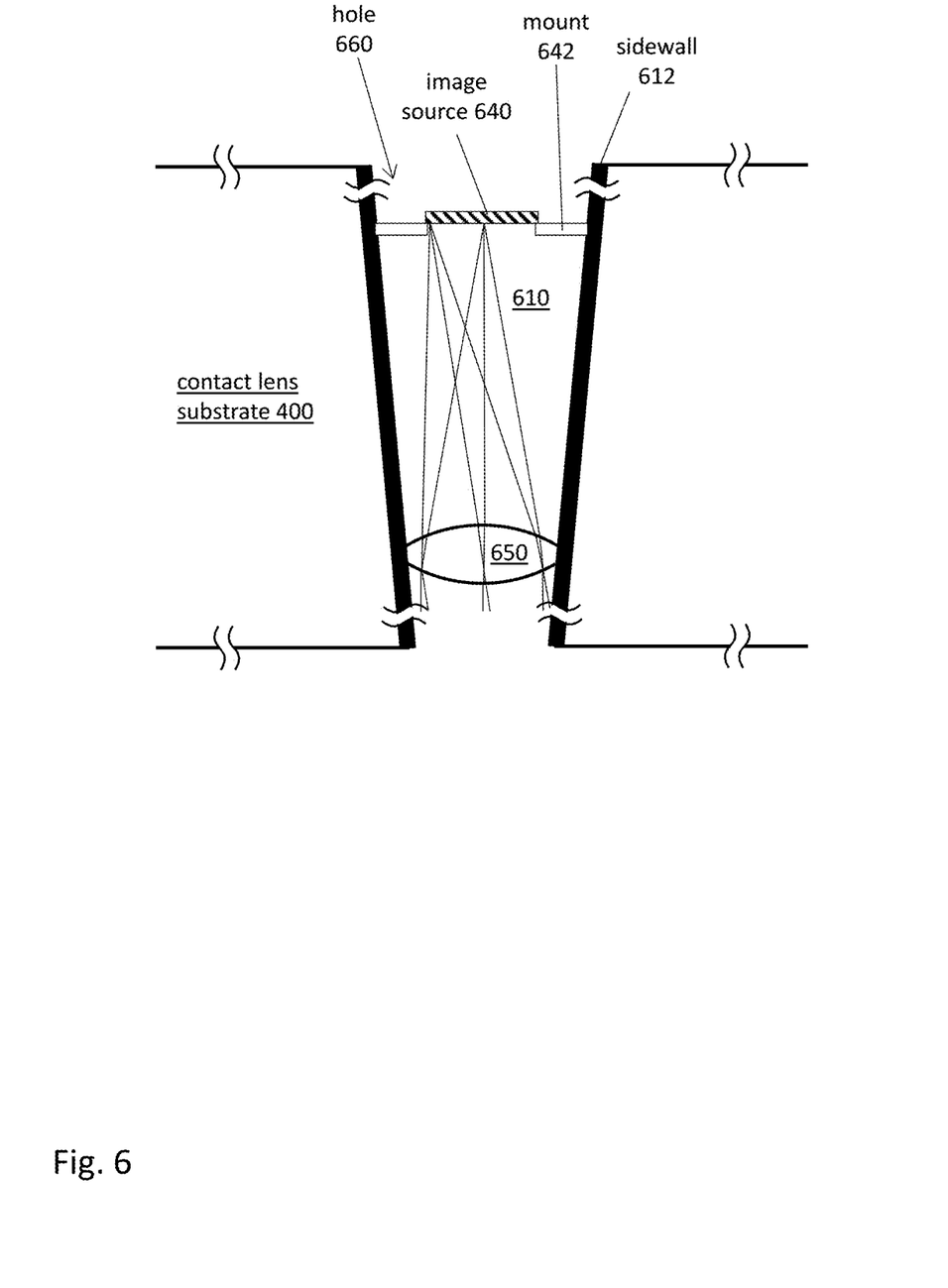
FIG. 6 shows a cross sectional view of another zone 1 peripheral femtoprojector.

FIG. 6 shows an example where the air core femtoprojector of FIG. 4 is constructed using a hole 660 with absorbing sidewalls 612. The lens 650 is first inserted into the hole 660. The core 610 is air. The image source 640 is mounted on a support 642 which fits into the hole 660.

Referring again to FIG. 2, the design of FIG. 3 (reflective design) may be used for the central femtoprojector 210, the design of FIG. 4 (biconvex lens design) may be used for the zone 1 peripheral femtoprojectors 220A, and the design of FIG. 5 (single surface design) may be used for the zone 2 peripheral femtoprojectors 220B.

Figure 7:
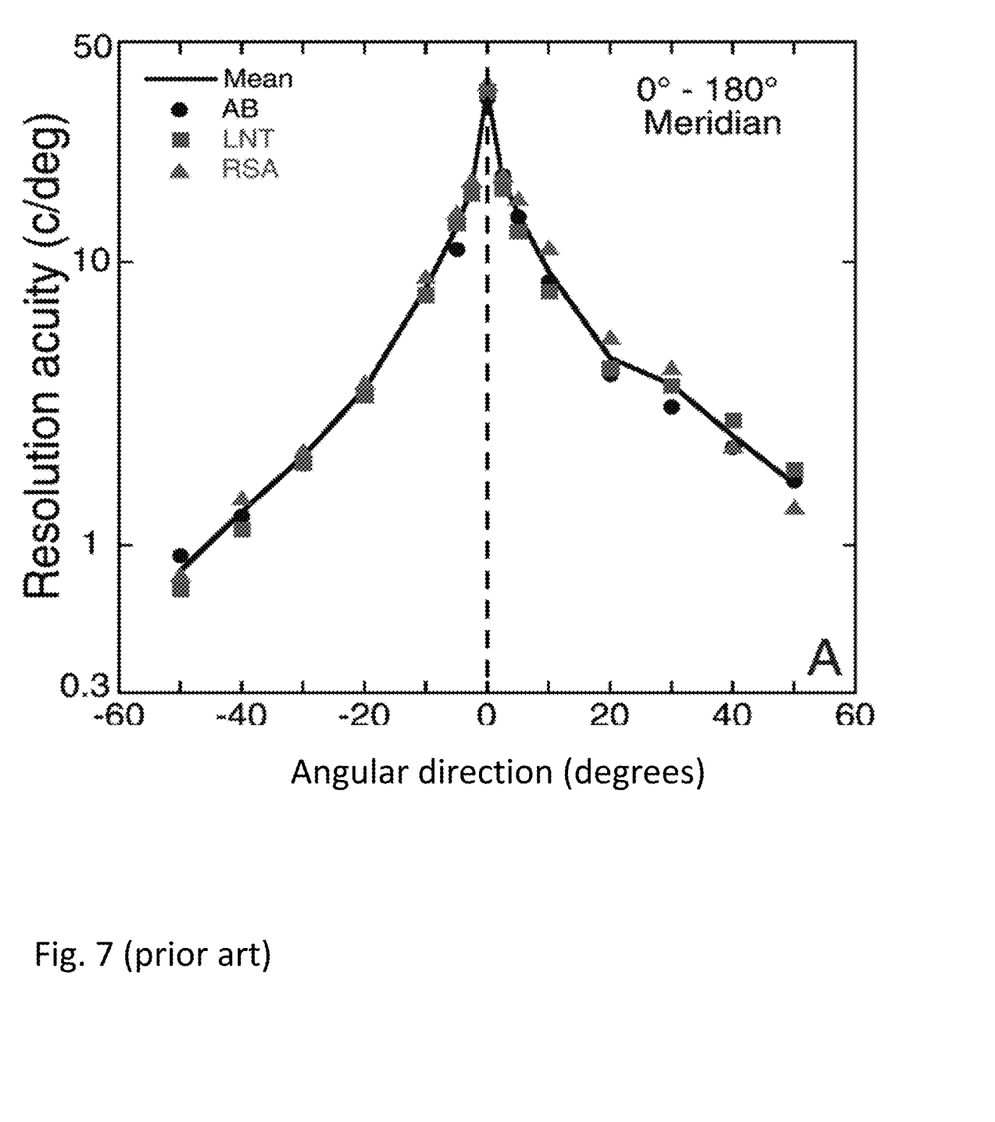
FIG. 7 (prior art) is a graph of the eye's visual acuity.
Figure 8:
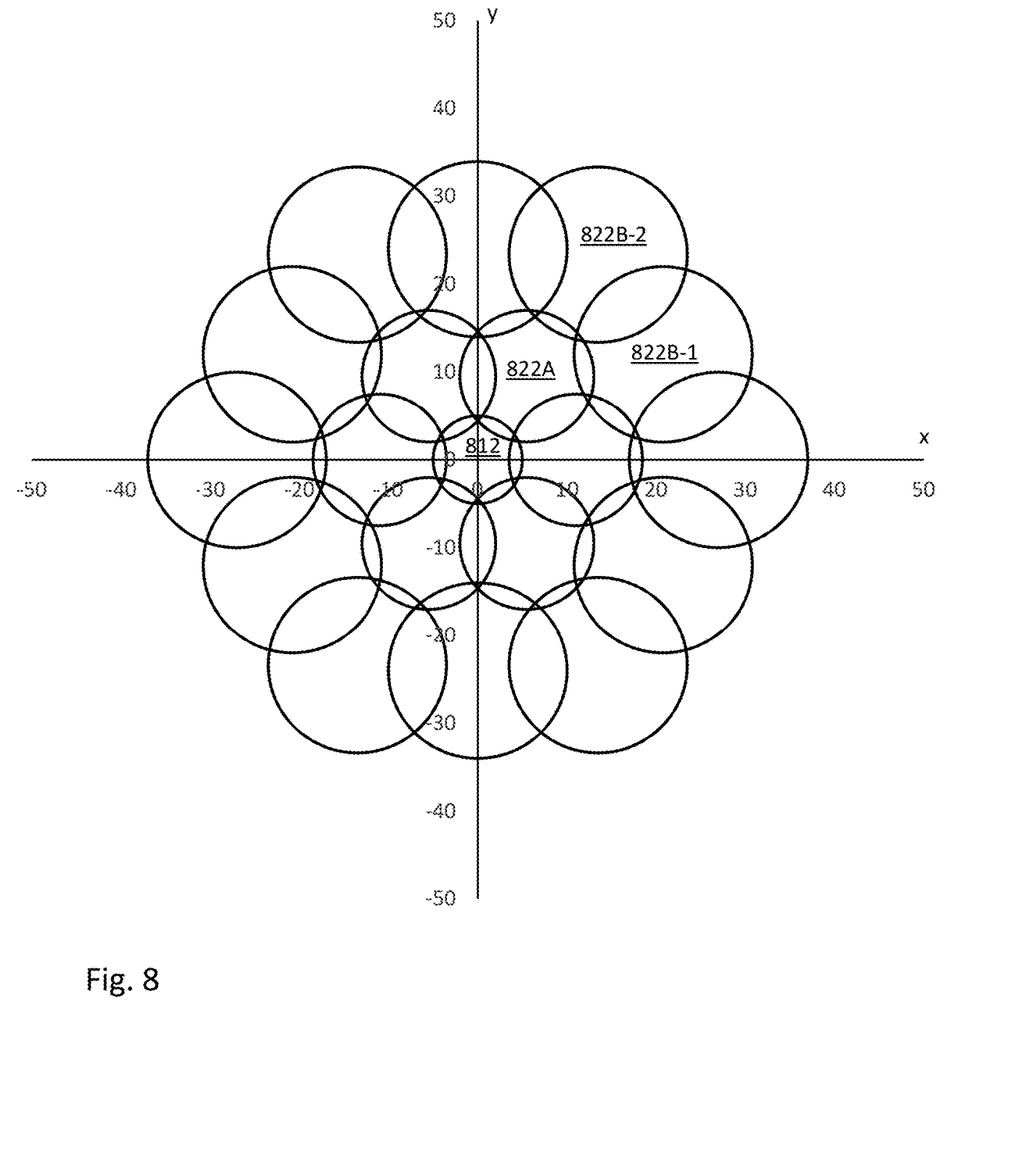
FIG. 8 shows virtual images in object space projected by a set of femtoprojectors.

FIGS. 7-8 and the corresponding text illustrate some example designs. FIG. 7 (prior art) is a graph of the eye's visual acuity as a function of angle in the visual field. This graph is measured along the horizontal, so for a person looking straight ahead to infinity, angle=0 degrees corresponds to straight ahead, angle=+20 degrees is 20 degrees towards the nose, and angle=−20 degrees is 20 degrees towards the temple. The angles are measured in air in object space.

FIG. 8 shows virtual images in object space projected by a set of femtoprojectors. The origin (0,0) represents the center of the user's field of view, plus and minus x values are degrees to the right and left of the center of the user's field of view, and plus and minus y values are degrees above and below the center of the user's field of view. The center circle 812 represents the virtual image projected by a central femtoprojector. There are six zone 1 virtual images 822A arranged in a hexagon around the center image 812. There are twelve zone 2 virtual images 822B arranged in an outer hexagon. These are divided into six edge images 822B-1 and six corner images 822B-2. For clarity, only one label is used for each type of image. The femtoprojectors that project these images are arranged approximately in the same geometry of concentric hexagons.

The central image 812 is produced by a femtoprojector of the class shown in FIG. 3, the zone 1 images 822A are produced by femtoprojectors of the class shown in FIG. 4, and the zone 2 images 822B are produced by femtoprojectors of the class shown in FIG. 5.

Table 1 below shows a class of designs. In this class, the central image 812 is produced by a femtoprojector of the type shown in FIG. 3, the zone 1 images 822A are produced by femtoprojectors of the type shown in FIG. 4, and the zone 2 images 822B are produced by femtoprojectors of the type shown in FIG. 5. For convenience, the image source and optical system for the femtoprojector are assumed to be circular, thus giving rise to the circular images shown in FIG. 8. The individual pixels are assumed to vary as a function of eccentricity, including within a femtoprojector. That is, femtoprojectors are assumed to have different size pixels. The pixel size is proportional to the resolutions shown in FIG. 7, with higher resolution for pixels that project to the fovea and lower resolutions for pixels that project to the periphery. The maximum span of eccentricity for the set of femtoprojectors is 74 degrees (2×37 degree max eccentricity for image 822B-2). Ignoring overlaps, the number of pixels is approximately 10,000 pixels for a 5 degree span of eccentricity, 45,000 pixels for 15 degrees, 90,000 pixels for 30 degrees, and 150,000 pixels for the full 74 degrees.

TABLE 1

Example Design 1

| Ref | | central 812 | peripheral 822A | peripheral 822B-1 | peripheral 822B-2 |
|---|---|---|---|---|---|
| 1 | N | 1 | 6 | 6 | 6 |
| 2 | Femtoprojector Dia (um) | <1000 | <500 | <500 | <500 |
| 3 | Image Source Dia (um) | <500 | <250 | <250 | <250 |
| 4 | Min Pixel Size (um) | <2 | <2 | <2 | <2 |
| 5 | Max Pixel Size (um) | >2 | >2 | >3 | >3 |
| 6 | Magnification | 5-10 | 10-30 | 10-30 | 10-30 |
| 7 | Min Retinal Pixel (um) | <10 | <20 | <50 | <60 |
| 8 | Max Retinal Pixel (um) | >20 | >50 | >70 | >100 |
| 9 | Span of Eccentricity (degrees in object space) | 10 | 15 | 20 | 20 |
| 10 | Center Location (degrees in object space) | 0 | 11 | 24 | 27 |
| 11 | Min Eccentricity (degrees in object space) | 0 | 3.5 | 14 | 17 |
| 12 | Max Eccentricity (degrees in object space) | 5 | 18.5 | 34 | 37 |
| 13 | Best Snellen (20/x) | <50 | <100 | <200 | <250 |
| 14 | Worst Snellen (20/x) | >70 | >200 | >300 | >400 |

Each column in the table is for a different zone of femtoprojectors. The quantities in the table are the following:
1. N. The number of femtoprojectors for the zone or sub-zone.

Quantities 2-6 are for the image source:
2. Femtoprojector Dia (um). The diameter of a cylinder that circumscribes the femtoprojector, in microns. For example, in FIG. 3, this would be the diameter of the primary mirror 360.
3. Image Source Dia (um). The diameter of the image source, in microns. In FIG. 3, this would be the diameter of the image source 340.
4. Min Pixel Size (um). The smallest pixel-pixel spacing in the femtoprojector, in microns. For a central femtoprojector, this spacing would occur at the center of the image source. For a peripheral femtoprojector, this spacing occurs at the edge that is projecting closest to the fovea.
5. Max Pixel Size (um). The largest pixel-pixel spacing in the femtoprojector, in microns. For a central femtoprojector, this spacing would occur at the edge of the image source. For a peripheral femtoprojector, this spacing would occur at the edge that is projecting farthest from the fovea.
6. Magnification. The magnification from the image source to the retinal image.

Quantities 7-8 are for the retinal image:
7. Min Retinal Pixel (um). The smallest pixel-pixel spacing in the retinal image, in microns.
8. Max Retinal Pixel (um). The largest pixel-pixel spacing in the retinal image, in microns.

Quantities 9-14 are for the virtual images, as shown in FIG. 8.

9. Span of Eccentricity (visual field, degrees). Angular size of the virtual image produced by the femtoprojector, in degrees in air in object space.
10. Center Location (visual field, degrees). Angular distance of the center of the virtual image produced by the femtoprojector from the visual axis.
11. Min Eccentricity (visual field, degrees). Angular distance of the inner edge of the virtual image produced by the femtoprojector from the visual axis.
12. Max Eccentricity (visual field, degrees). Angular distance of the outer edge of the virtual image produced by the femtoprojector from the visual axis. For example, the central image 812 is centered on axis (0 degrees), and spans from 0 to 5 degrees for a 10 degree span of eccentricity (−5 to +5 degrees). Peripheral image 822A has a center that is 11 degrees off-axis, and spans from 3.5 to 18.5 degrees for a 15 degree span of eccentricity.
13. Best Snellen (20/x). The equivalent visual acuity of the smallest pixels, which are the pixels closest to the fovea. For the central femtoprojector, this quantity is <50, meaning that the equivalent visual acuity is 20/50 or better.
14. Worst Snellen (20/x). The equivalent visual acuity of the largest pixels, which are the pixels farthest from the fovea. For the central femtoprojector, this quantity is >70, meaning that the equivalent visual acuity is 20/70 or worse.

In the design of Table 1, note that the central femtoprojector has a diameter of <1000 um, while the peripheral femtoprojectors have diameters of <500 um. If the peripheral femtoprojector is comparable in size to the central femtoprojector, then it will have a maximum lateral dimension of approximately 1 mm or less. If it is smaller, as in this example, the maximum lateral dimension may be 500 um or less. The peripheral femtoprojectors also have larger magnifications because the pixels at the retina can be larger. In this example, the magnification is at least 10×.

Table 2 shows another class of designs which is lower resolution. The Ref numbers are the same as in Table 1. In this example, the central image 812 is produced by a femtoprojector of the type shown in FIG. 3, and the zone 1 and zone 2 images 822A-B are produced by femtoprojectors of the type shown in FIG. 5. The maximum span of eccentricity for the set of femtoprojectors is 82 degrees. Ignoring overlaps, the number of pixels is approximately 7,000 pixels for a 5 degree span of eccentricity, 30,000 pixels for 15 degrees, 65,000 pixels for 30 degrees, and 115,000 pixels for the full 82 degrees.

TABLE 2

| | | Example Design 2 | | | |
|---|---|---|---|---|---|
| Ref | | central 812 | peripheral 822A | peripheral 822B-1 | peripheral 822B-2 |
| 1 | N | 1 | 6 | 6 | 6 |
| 2 | Femtoprojector Dia (um) | <1000 | <500 | <500 | <500 |
| 3 | Image Source Dia (um) | <500 | <250 | <250 | <250 |
| 4 | Min Pixel Size (um) | <2 | <2 | <2 | <2 |
| 5 | Max Pixel Size (um) | >2 | >2 | >3 | >3 |
| 6 | Magnification | 5-15 | 10-30 | 10-30 | 10-30 |
| 9 | Span of Eccentricity (degrees in object space) | 15 | 20 | 20 | 20 |
| 10 | Center Location (degrees in object space) | 0 | 15 | 28 | 31 |
| 11 | Min Eccentricity (degrees in object space) | 0 | 5 | 18 | 21 |
| 12 | Max Eccentricity (degrees in object space) | 7.5 | 25 | 38 | 41 |
| 13 | Best Snellen (20/x) | <60 | <100 | <200 | <250 |
| 14 | Worst Snellen (20/x) | >90 | >200 | >300 | >400 |

Although the detailed description contains many specifics, these should not be construed as limiting the scope of the invention but merely as illustrating different examples. It should be appreciated that the scope of the disclosure includes other embodiments not discussed in detail above. For example, the core may be other shapes, such as cylindrical or using polygon bases. Various other modifications, changes, and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. An eye-mounted display comprising:
   a contact lens containing a plurality of femtoprojectors that project an image to a user's retina;
   the plurality of femtoprojectors including a first group of one or more central femtoprojectors that projects a first portion of the image with a first resolution to a first region of the retina, where each central femtoprojector comprises reflective optics;
   the plurality of femtoprojectors further including a second group of one or more peripheral femtoprojectors that projects a second portion of the image with a second resolution to a more peripheral region of the retina, where the second resolution is lower than the first resolution;
   each of the peripheral femtoprojectors comprising:
      an image source;
      an optically transparent core bounded by a first end and a second end opposite the first end;
      a sidewall structure that extends between the two ends; and
      a lens element positioned at the second end.

2. The eye-mounted display of claim 1 where the first group projects to a fovea of the retina.

3. The eye-mounted display of claim 1 where the second group projects to a peripheral region of the retina outside the fovea.

4. The eye-mounted display of claim 1 where the second group comprises a plurality of peripheral femtoprojectors and the second group projects to an annular region.

5. The eye-mounted display of claim 1 where the first portion of the image is circular in shape, the second portion of the image is annular in shape, and the first and second portions overlap to create the image without any gaps.

6. The eye-mounted display of claim 1 where each peripheral femtoprojector projects pixels that are at least 15 um in size at the retina.

7. The eye-mounted display of claim 1 where the second group projects with a magnification that is higher than a magnification of the first group.

8. The eye-mounted display of claim 1 where the first and second portions of the image together have a span of eccentricity at least 40 degrees as measured in object space.

9. The eye-mounted display of claim 1 where the plurality of femtoprojectors further includes a third group of one or more of the peripheral femtoprojectors, the third group projecting a third portion of the image with a third resolution to a region of the retina that is more peripheral than the second group, where the third resolution is lower than the second resolution.

10. The eye-mounted display of claim 9 where the femtoprojectors in the second group use a different optical design than the femtoprojectors in the third group.

11. The eye-mounted display of claim 10 where the core is an air core for the femtoprojectors in the second group, and the core is formed of a solid transparent material for the femtoprojectors in the third group.

12. The eye-mounted display of claim 10 where the lens is a biconvex lens for the femtoprojectors in the second group, and the lens is a single curved surface for the femtoprojectors in the third group.

13. The eye-mounted display of claim 10 where the second group and third group use a different resolution image source in their femtoprojectors.

14. The eye-mounted display of claim 13 where the femtoprojectors in the second group and in the third group project images with a same magnification.

15. The eye-mounted display of claim 9 where the femtoprojectors in the second group project with a resolution of not better than 20/50 at the retina, and the femtoprojectors in the third group project with a resolution at the retina that is at least 2 times worse than the second group.

16. The eye-mounted display of claim 9 where the femtoprojectors in the second group in the and third group project with a magnification of at least 20×.

17. An eye-mounted display comprising:
a contact lens containing a plurality of femtoprojectors that project an image to a user's retina;
the plurality of femtoprojectors including a first group of one or more central femtoprojectors that projects a first portion of the image with a first resolution to a first region of the retina;
the plurality of femtoprojectors further including a second group of one or more peripheral femtoprojectors that projects a second portion of the image with a second resolution to a more peripheral region of the retina, where the second resolution is lower than the first resolution;
each of the peripheral femtoprojectors comprising:
an image source;
an optically transparent core bounded by a first end and a second end opposite the first end, where the first end is larger in area than the second end;
a sidewall structure that extends between the two ends; and
a lens element positioned at the second end.

18. An eye-mounted display comprising:
a contact lens containing a plurality of femtoprojectors that project an image to a user's retina;
the plurality of femtoprojectors including a first group of one or more central femtoprojectors that projects a first portion of the image with a first resolution to a first region of the retina;
the plurality of femtoprojectors further including a second group of one or more peripheral femtoprojectors that projects a second portion of the image with a second resolution to a more peripheral region of the retina, where the second resolution is lower than the first resolution and each peripheral femtoprojector projects with a resolution of not better than 20/60 at the retina;
each of the peripheral femtoprojectors comprising:
an image source;
an optically transparent core bounded by a first end and a second end opposite the first end;
a sidewall structure that extends between the two ends; and
a lens element positioned at the second end.

19. An eye-mounted display comprising:
a contact lens containing a plurality of femtoprojectors that project an image to a user's retina;
the plurality of femtoprojectors including a first group of one or more central femtoprojectors that projects a first portion of the image with a first resolution to a first region of the retina;
the plurality of femtoprojectors further including a second group of one or more peripheral femtoprojectors that projects a second portion of the image with a second resolution to a more peripheral region of the retina, where the second resolution is lower than the first resolution and each peripheral femtoprojector projects with a magnification of at least 20×;
each of the peripheral femtoprojectors comprising:
an image source;
an optically transparent core bounded by a first end and a second end opposite the first end;
a sidewall structure that extends between the two ends; and
a lens element positioned at the second end.

* * * * *

UNITED STATES PATENT AND TRADEMARK OFFICE
CERTIFICATE OF CORRECTION

PATENT NO. : 10,580,334 B2  
APPLICATION NO. : 15/982989  
DATED : March 3, 2020  
INVENTOR(S) : Brian Elliot Lemoff Page 1 of 1

It is certified that error appears in the above-identified patent and that said Letters Patent is hereby corrected as shown below:

On the Title Page

Item (57) Abstract, delete "optical system" and insert --optical systems--.

In the Claims

On Column 11, Line 40, Claim 16, delete "second group in the and third group" and insert --second group and in the third group--.

Signed and Sealed this  
Fifteenth Day of September, 2020

Andrei Iancu  
*Director of the United States Patent and Trademark Office*